(12) United States Patent
Blouin (10) Patent No.: US 9,920,820 B2
(45) Date of Patent: Mar. 20, 2018

(54) OVER CLAMPING PROTECTION METHOD AND CLAMPING MECHANISM THEREFOR

(75) Inventor: Alexandre Blouin, Beloeil (CA)

(73) Assignee: TRANSMISSION CVTCORP INC., Ste-Julie, Quebec (CA)

( * ) Notice: Subject to any disclaimer, the term of this patent is extended or adjusted under 35 U.S.C. 154(b) by 259 days.

(21) Appl. No.: 14/419,012

(22) PCT Filed: Aug. 3, 2012

(86) PCT No.: PCT/CA2012/000731
§ 371 (c)(1),
(2), (4) Date: Mar. 5, 2015

(87) PCT Pub. No.: WO2014/019053
PCT Pub. Date: Feb. 6, 2014

(65) Prior Publication Data
US 2015/0211610 A1 Jul. 30, 2015

(51) Int. Cl.
| | | |
|---|---|---|
| *F16H 61/664* | (2006.01) |
| *F16H 15/38* | (2006.01) |
| *F16H 15/50* | (2006.01) |
| *F16H 15/36* | (2006.01) |
| *F16H 15/40* | (2006.01) |

(52) U.S. Cl.
CPC ......... *F16H 15/38* (2013.01); *F16H 61/6649* (2013.01); *F16H 15/36* (2013.01); *F16H 15/40* (2013.01); *F16H 15/503* (2013.01)

(58) Field of Classification Search
CPC ...... F16H 61/6649; F16H 15/38; F16H 15/36; F16H 15/40; F16H 15/503
USPC .................................................. 476/48, 37
See application file for complete search history.

(56) References Cited

U.S. PATENT DOCUMENTS

| | | | | |
|---|---|---|---|---|
| 2,325,502 | A | * | 7/1943 | Georges ................. F16H 15/38 476/41 |
| 2,730,904 | A | * | 1/1956 | Rennerfelt ............. F16H 13/14 476/41 |
| 3,277,745 | A | | 10/1966 | Harned et al. |
| 3,822,610 | A | * | 7/1974 | Erban ..................... F16H 13/14 475/190 |
| 4,272,999 | A | * | 6/1981 | Perry ..................... F16H 15/38 476/10 |

(Continued)

FOREIGN PATENT DOCUMENTS

| | | |
|---|---|---|
| CA | 2516494 | 9/2004 |
| WO | 2011129898 | 10/2011 |

(Continued)

OTHER PUBLICATIONS

PCT International Search Report for PCT International Application No. PCT/CA2012/000731, dated Feb. 15, 2013, (3 pages).

(Continued)

*Primary Examiner* — David M Fenstermacher
*Assistant Examiner* — Randell J Krug
(74) *Attorney, Agent, or Firm* — K&L Gates LLP (57) ABSTRACT

A method where the spin factor is looked up in a table; the slip factor is measured and the clamping pressure is adjusted to achieve a slip/spin ratio provided in a desired range is described herein. According to another aspect, an active mechanical clamping mechanism using a radially movable contact point is also described.

16 Claims, 10 Drawing Sheets

(56) References Cited

U.S. PATENT DOCUMENTS

| | | | | |
|---|---|---|---|---|
| 5,379,661 A | * | 1/1995 | Nakano | F16H 13/14 |
| | | | | 192/93 A |
| 7,011,600 B2 | * | 3/2006 | Miller | B62M 9/08 |
| | | | | 476/36 |
| 8,740,743 B2 | * | 6/2014 | Kliewer | F16H 61/66272 |
| | | | | 475/196 |
| 2010/0167868 A1 | | 7/2010 | Kamiya et al. | |
| 2014/0257655 A1 | * | 9/2014 | Beaudoin | F16H 61/6649 |
| | | | | 701/58 |
| 2014/0323258 A1 | * | 10/2014 | Oliver | F16H 13/08 |
| | | | | 475/114 |
| 2015/0267794 A1 | * | 9/2015 | Rajendran | F16H 29/20 |
| | | | | 74/121 |

FOREIGN PATENT DOCUMENTS

| | | | | |
|---|---|---|---|---|
| WO | 2011134076 | 11/2011 | | |
| WO | WO 2011134076 A1 | * | 11/2011 | ............ F16H 15/38 |
| WO | WO-2011134076 A1 | * | 11/2011 | ............ F16H 15/38 |
| WO | 2013/029147 A1 | 3/2013 | | |

OTHER PUBLICATIONS

Supplementary European Search Report for EP Application No. EP12882490, Date of Completion of Search: Oct. 18, 2016, 13 pgs.

* cited by examiner

OVER CLAMPING PROTECTION METHOD AND CLAMPING MECHANISM THEREFOR

CROSS REFERENCE TO RELATED APPLICATIONS

This is the national phase under 35 U.S.C. § 371 of International Application No. PCT/CA2012/000731 filed on Aug. 3, 2012, the entire disclosure of which is incorporated by reference herein.

FIELD

The present disclosure generally relates to Toric-drive Continuously Variable Transmissions. More specifically, the present disclosure is concerned with methods and clamping mechanisms to prevent over clamping of such transmissions and to mechanically control the clamping pressure applied to such transmission.

BACKGROUND

Toric-drive Continuously Variable Transmissions (hereinafter generically referred to as "CVT") are believed known in the art. The operation of such a CVT will therefore only be briefly discussed herein.

Generally stated, a CVT is provided with a drive disk having a toroidal surface, a driven disk also having a toroidal surface and facing the toroidal surface of the drive disk, both disks being linked by rollers in contact with their respective toroidal surfaces. The angle of the rollers with respect to the drive and driven disks dictates the speed ratio between the driven and drive disks since this angle dictates the radial position at which the rollers contact the toroidal surfaces.

Such a CVT generally requires some kind of preloading mechanism to force the drive and driven disks towards each other to provide a predetermined minimal friction between the disks and the rollers. A pressure-applying mechanism, also known as a clamping mechanism, is generally also provided to increase the pressure compressing the disks towards each other, therefore increasing the pressure between the disks and the rollers, when the CVT is in use.

It has been found that in a CVT configuration, the clamping forces have an impact on the lifespan of the CVT components, particularly on the disks. In other words, over clamping may be detrimental to the lifespan of the CVT.

It also has been found that to prevent slippage, a sufficient clamping force has to be applied to ensure that an adequate friction exists between the rollers and the disks. The slip amount is generally determined as the difference in linear speed between the driving surface and the driven surface.

The spin is defined as a pivoting or rotating motion of two surfaces in contact relative to each other. When two curved or rounded bodies are compressed together, an ellipse is formed at the point of contact. Because the two bodies do not rotate about the same axis, and since the plane of contact can be in various positions relative to the axis of rotation of the two bodies, the ellipse of contact of the first body will be in a rotating or pivoting motion relative to the ellipse of contact of the second body. This relative motion of rotation of two ellipses in contact is referred to as spin.

It has been found that by providing a slip/spin ratio of about 0.8 the contact has the most efficient power transmission. In each contact, there is a loss of speed due to slip, and a loss of torque due to spin. At a ratio of slip to spin of about 0.8, the proportion of loss of each is minimised yielding the best efficiency. At greater rates of spin, torque loss increases at a greater rate than slip loss decreases, and subsequently decreases efficiency. At greater rates of slip, it is the opposite, the power loss due to slip is greater than the decrease in torque loss due to decreased spin.

BRIEF DESCRIPTION OF THE DRAWINGS

In the appended drawings:

FIG. 12 is an exploded view of the actuating assembly of FIG. 11;

DETAILED DESCRIPTION

The use of the word "a" or "an" when used in conjunction with the term "comprising" in the claims and/or the specification may mean "one", but it is also consistent with the meaning of "one or more", "at least one", and "one or more than one". Similarly, the word "another" may mean at least a second or more.

As used in this specification and claim(s), the words "comprising" (and any form of comprising, such as "comprise" and "comprises"), "having" (and any form of having, such as "have" and "has"), "including" (and any form of including, such as "include" and "includes") or "containing" (and any form of containing, such as "contain" and "contains"), are inclusive or open-ended and do not exclude additional, unrecited elements or process steps.

The term "about" is used to indicate that a value includes an inherent variation of error for the device or the method being employed to determine the value.

It is to be noted that the expression "prime mover" is to be construed herein and in the appended claims as an internal combustion engine a turbine engine, or any other mechanical power production element, assembly or mechanism.

It is to be noted that while the expression "CVT", standing for Continuously Variable Transmission, is generally used herein to refer to a dual-cavity full toroidal CVT, this expression is to be construed herein and in the appended claims as any type of toroidal CVT such as, for example, half-toroidal CVT and single cavity toroidal CVT.

It is to be noted that the expression "overdrive", when used herein in the context of a CVT, is to be construed herein and in the appended claims as a condition where the CVT ratio is such that the CVT output speed is higher than the CVT input speed.

It is to be noted that the expression "underdrive" when used herein in the context of a CVT, is to be construed herein and in the appended claims as a condition where the CVT ratio is such that the CVT output speed is lower than the CVT input speed.

Further, in this specification, the terms "axial direction", "axially", "axial", and the like, refer to the direction of the rotation axis of the shaft and the directions corresponding to them, the terms "radial direction", "radially", "radial", and the like, refer to the directions perpendicular to such axial directions, and the terms "circumferential direction", "circumferentially", "circumferential", and the like, refer to each direction along the circumference of a circle drawn about a given point of the rotation axis on a plane perpendicular to the rotation axis.

Other objects, advantages and features of the present invention will become more apparent upon reading of the following non-restrictive description of illustrative embodiments thereof, given by way of example only with reference to the accompanying drawings.

According to an illustrative embodiment, there is provided an active clamping mechanism for a CVT provided with a longitudinal drive shaft, a drive disk and a driven disk, the active clamping mechanism comprising:

a pressure-applying element longitudinally movable onto the drive shaft; the pressure-applying element having a first surface configured to contact one of the drive and driven disks and an opposite surface including at least three V-shaped double ramps;

a secondary element so mounted to the longitudinal drive shaft as to be axially fixed thereonto; the secondary element having a surface facing the pressure-applying element including at least three V-shaped double ramps;

at least three ball bearings interposed between the V-shaped ramps of the pressure-applying and secondary elements;

a radially variable position driving assembly so configured as to transmit torque to both the pressure-applying and secondary elements in a proportion determined by the radial position of a radially movable carriage thereof; one of the pressure-applying element and the secondary element being free to rotate about the drive shaft and the other of the pressure-applying element and the secondary element being so mounted to the drive shaft as to be prevented from rotating thereabout;

whereby, the portion of torque applied to the pressure-applying element results in a pressure applied to the one of the drive and driven disks via a small circumferential displacement of the at least three ball bearings in the facing V-shaped double ramps of the pressure-applying and secondary elements.

Generally stated, illustrative embodiments describe an active mechanical clamping mechanism using a radially movable contact point to change the proportion of the torque contributing to a clamping action.

The spin factor is determined by the geometry of the rollers, of the disks, of the angular position of the rollers in the cavities, by the clamping pressure, by the rotation speed of the rollers and disks and by the dimension of the ellipse formed at the point of contact between rollers and disks. Since the geometry of the rollers and of the disks does not change, it is therefore possible to calculate a table of the spin factor for every angular position of the rollers in the cavities as a function of the clamping force applied.

The slip factor is therefore the variable that may be used to control the CVT so as to improve its overall efficiency. Accordingly, a table may be constructed, empirically or otherwise, to determine the amount of slip required for each angular position of the rollers to achieve the desired Slip/Spin ratio.

As will easily be understood by one skilled in the art, the slip factor may be measured by measuring the rotational speed of the disks and rollers.

The clamping forces that influence the slip may thus be controlled by an active clamping system that may quickly change the axial clamping pressure applied onto the disks of the CVT. Accordingly, for a given angular position of the rollers in the cavities, since the spin is known, a clamping force is generated to bring the measured slip to a value such as to bring the Slip/Spin ratio to about 0.8.

Figure 1:
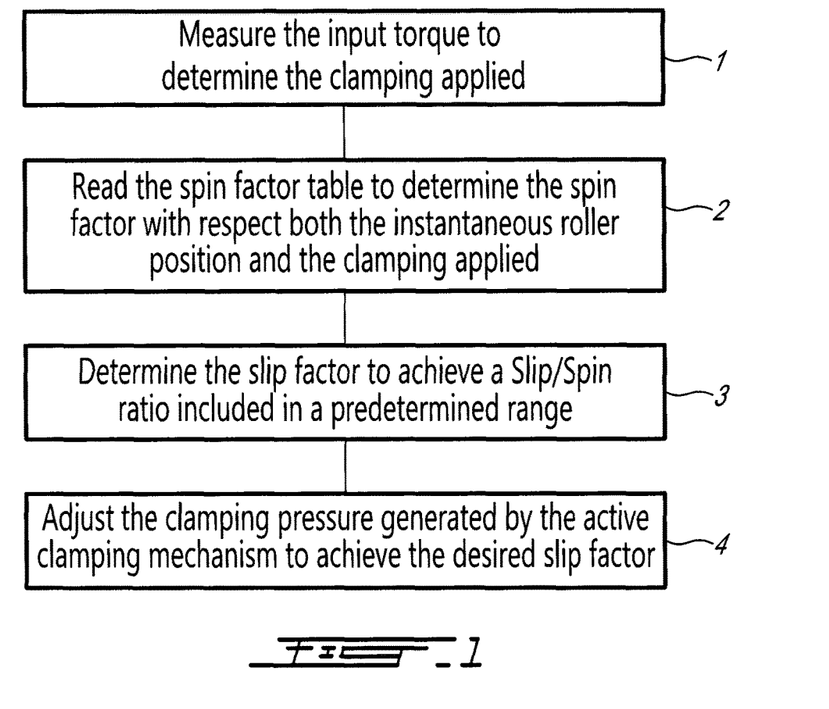
FIG. 1 is a block diagram of a method for preventing over clamping according to an illustrative embodiment.

FIG. 1 of the appended drawings schematically illustrates an over clamping protection method according to an illustrative embodiment. Once a spin table is constructed according to the geometry of the particular CVT configuration, step 1 consists in measuring the input torque of the CVT to calculate the clamping force applied. In step 2, the spin factor table is read to determine the spin factor with respect to the instantaneous roller position and clamping force applied. Then, in step 3, the desired slip factor is determined. Step 4 consists in adjusting the clamping pressure generated by the active clamping mechanism to achieve the desired slip factor. Step 4 is repeated periodically to ensure that the slip factor remains stable. Steps 1 to 4 are repeated each time the roller position is modified and each time the torque applied is modified.

Generally stated, the active clamping mechanisms according to illustrative embodiments generate a controllable axial clamping force that mechanically applies pressure onto the disk of the CVT by transferring a controllable portion of the rotational torque received from a prime mover thereto.

Figure 2:
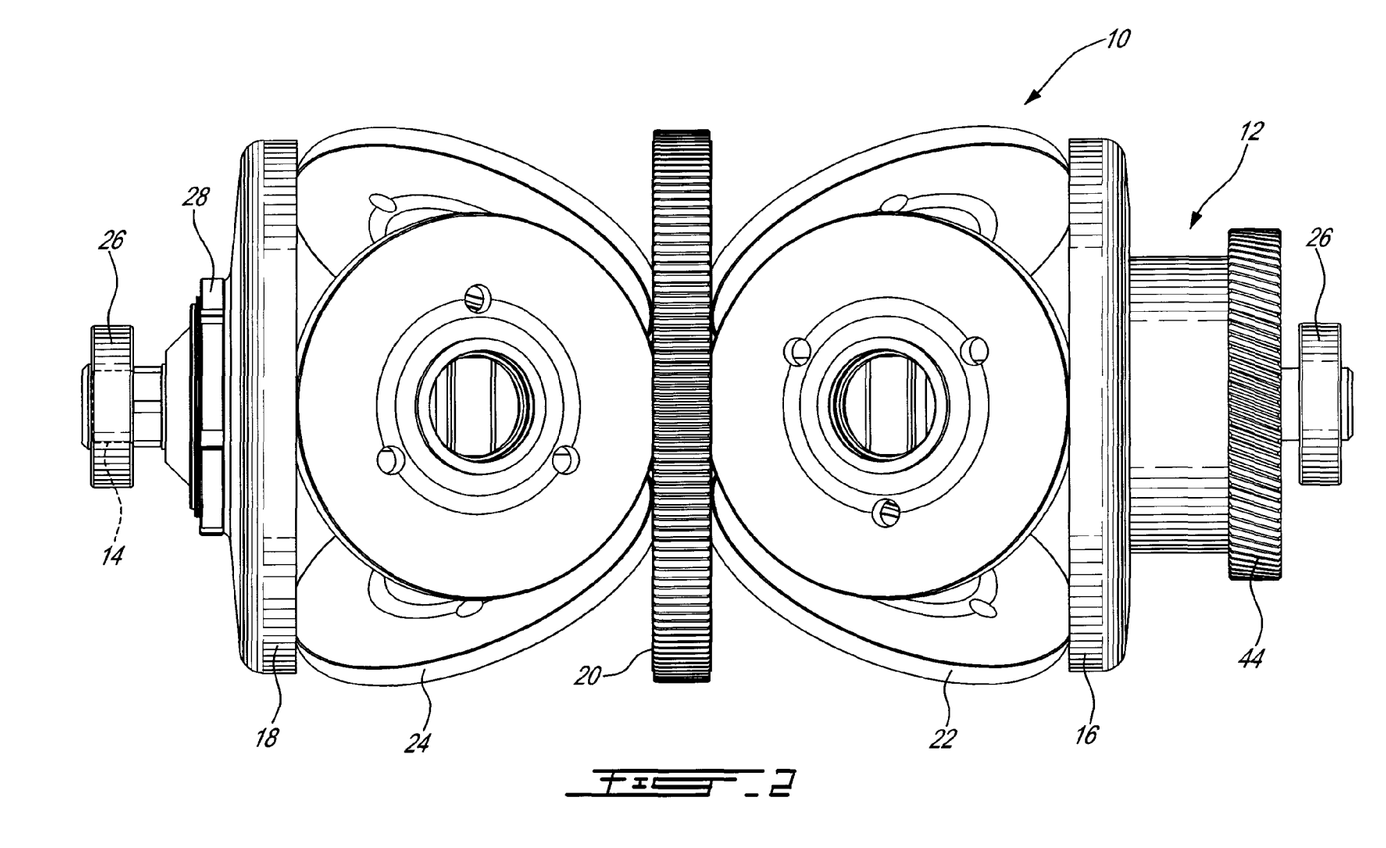
FIG. 2 is a front elevation view of a dual-cavity full toroidal CVT provided with an active clamping mechanism according to an illustrative embodiment.

Turning now to FIG. 2 of the appended drawings, a dual-cavity toric-drive CVT 10 including an active clamping mechanism 12 according to an illustrative embodiment will be described.

The toric-drive CVT 10 includes a longitudinal shaft 14 (shown in dashed lines) to which are mounted first and second drive disks 16 and 18 for rotation therewith. A driven disk 20 having a toothed outer surface is rotatably mounted to the shaft 14, for example via bearings (not shown). Three rollers 22 are provided between the first drive disk 16 and the driven disk 20 while three rollers 24 are provided between the second drive disk 18 and the driven disk 20. The longitudinal shaft 14 is mounted to a casing (not shown) via bearings 26. A preload tensioning nut 28 and the active clamping mechanism 12 are mounted near opposite longitudinal ends of the shaft 14.

It will easily be understood by one skilled in the art that the dual cavity toric-drive CVT 10 is only schematically illustrated in FIG. 1. Indeed, many subsystems such as, for example, a casing and a roller guiding subsystem, are not shown for clarity and since they have no incidence on the structure and operation of the active clamping mechanism described herein.

Figure 3:
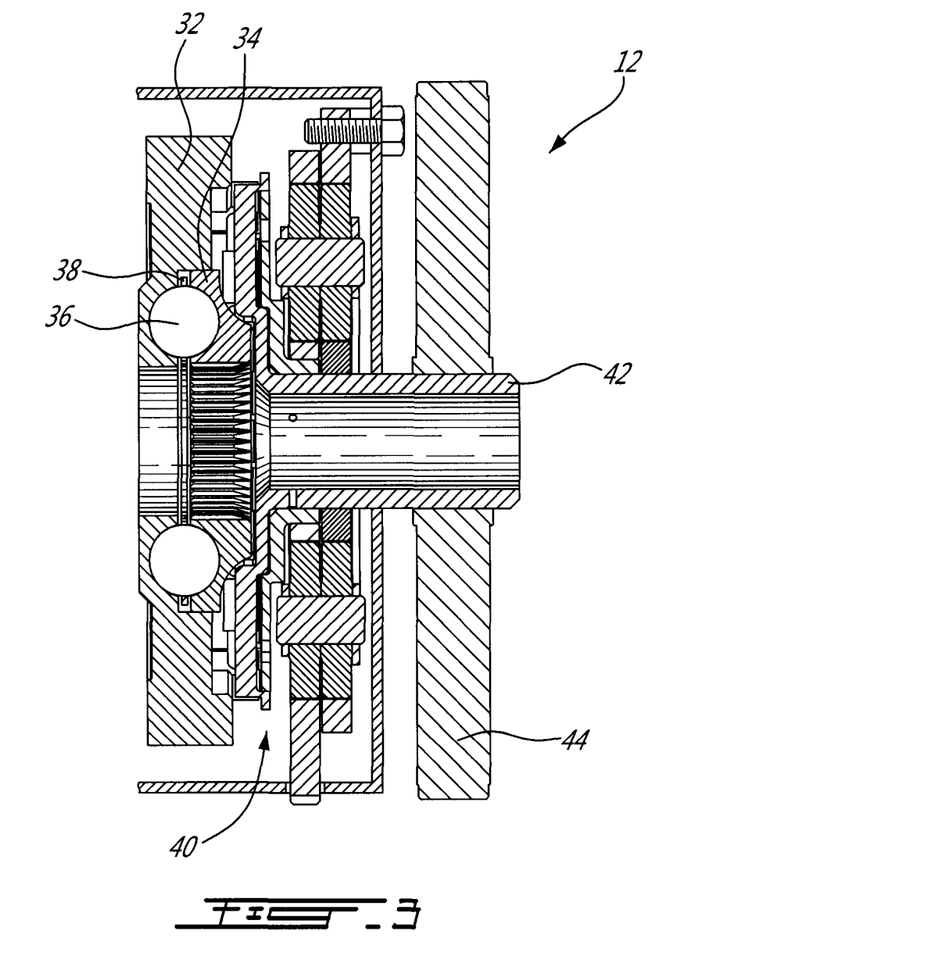
FIG. 3 is a sectional view of the active clamping mechanism of FIG. 2.
Figure 4:
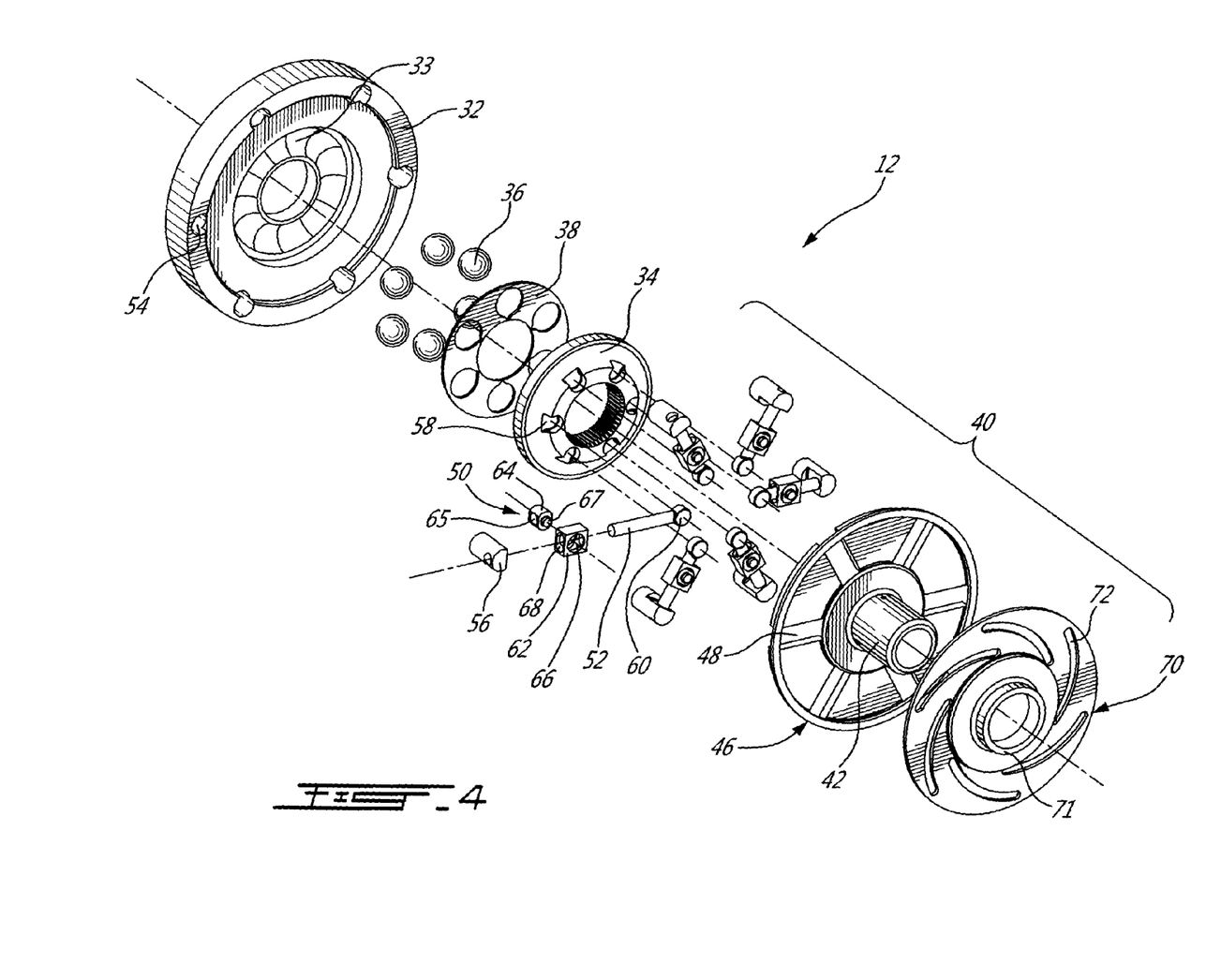
FIG. 4 is an exploded view of the active clamping mechanism shown without the actuating assembly.

Turning now to FIGS. 3 and 4 of the appended drawings, the active clamping mechanism 12 will be described.

The active clamping mechanism 12 includes a pressure-applying element 32, a secondary element in the form of a shaft driving element 34, a plurality of ball bearings 36 mounted in a cage 38 and provided between the pressure-applying element 32 and the shaft driving element 34. As can be seen from FIG. 4, the surface of the pressure-applying element 32 facing the shaft driving element 34 includes, for each ball bearing 36, a ball bearing-receiving V-shaped double ramp 33. Similarly, the surface of the shaft driving element 34 facing the pressure-applying element 32 includes, for each ball bearing 36, a ball bearing-receiving V-shaped double ramp (not shown).

A radially variable position driving assembly 40 interconnects a prime mover (not shown) to the pressure-applying element 32 and to the shaft-driving element 34.

The radially variable position driving assembly 40 includes an input shaft 42 configured to receive a gear 44 (see FIG. 2) and provided with a connecting plate 46 having six radial guiding slots 48. Six radially movable carriages 50 are mounted on respective radial shafts 52, anchored to both the pressure-applying element 32 and the shaft-driving element 34. More specifically, each shaft 52 is anchored to a respective semi-circular notch 54 of the pressure-applying element 32 via a bracket 56 and to a respective semi-circular notch 58 of the shaft-driving element 34 via a circular projection 60 thereof.

As can be better seen from FIG. 4, each carriage 50 includes a cubical torque-receiving element 62 and a generally cylindrical driven element 64 provided with a cylindrical and radial aperture 65 allowing the driven element 64 to be slidably mounted to the shaft 52. The driven element 64 includes an axial projection 67 and can be nested in the torque-receiving element 62, thanks to an axial cylindrical aperture 66 of the torque-receiving element 62. The cubical torque-receiving element 62 also includes a generally oblong radial aperture 68 allowing the torque-receiving element 62 to be slidably mounted to the shaft 52 while allowing slight angular movements of the torque-receiving element 62 with respect to the shaft.

The cubical torque-receiving element 62 is so configured and sized as to slidably fit in the slot 48 of the connecting plate 46.

The driving assembly 40 also includes a control plate 70 rotatably mounted to the shaft 42 and including a series of curved slots 72 configured and sized to receive the axial projections 67 of the driving elements 64 of the carriages 50.

One skilled in the art, will understand that since the cubical torque-receiving elements 62 are slidably mounted in the radial slots 48 of the plate 46 and since the projections 67 of the driving elements 64 are received in the curved slots 72, rotation of the control plate 70 with respect to the shaft 42 causes a radial movement of the carriages 50.

Figure 13:
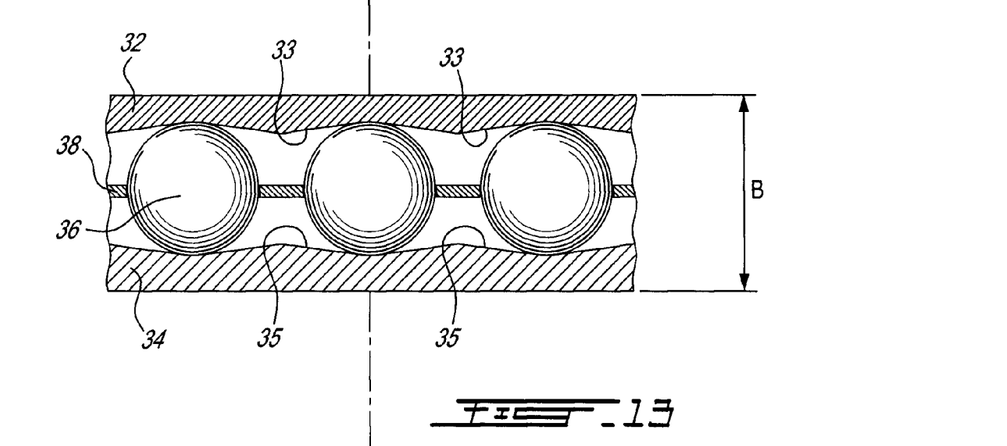
FIG. 13 is a sectional view of a portion of the clamping mechanism when the clamping mechanism is at rest.
Figure 14:
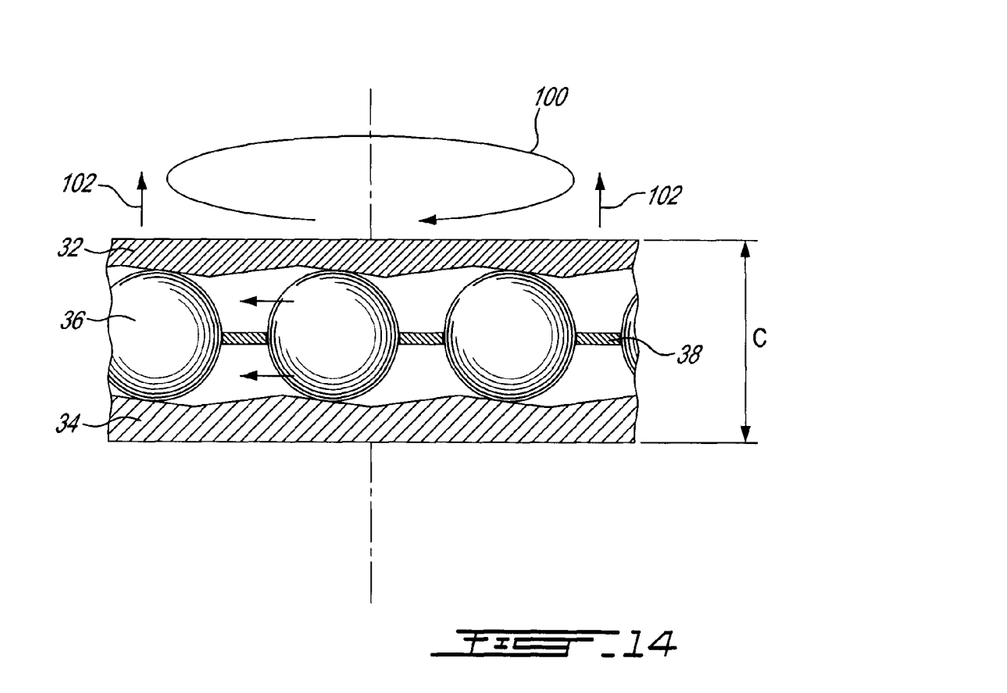
FIG. 14 is a sectional view similar to FIG. 13 showing the clamping mechanism in operation.
Figure 17:
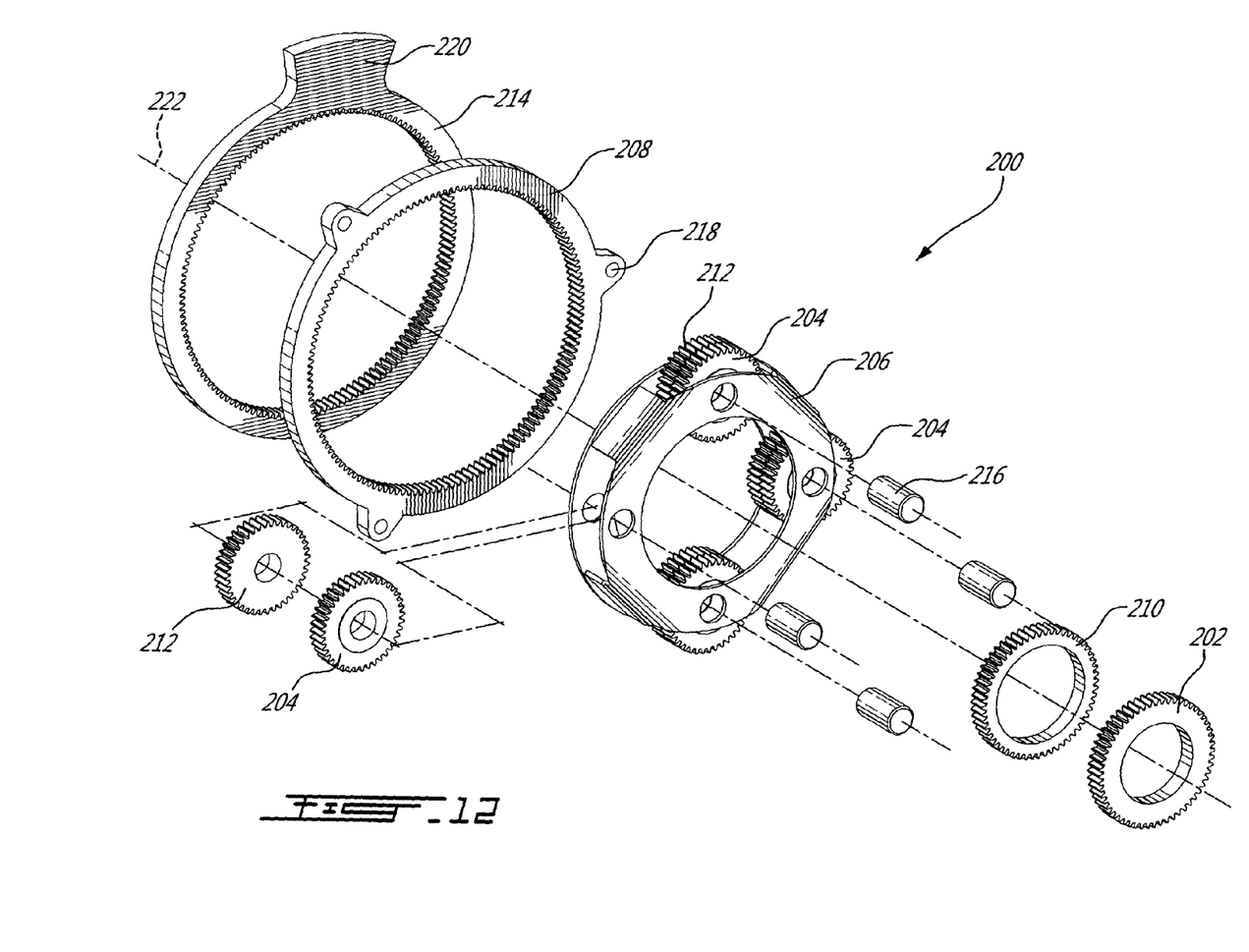

Turning now briefly to FIGS. 13 and 14 of the appended drawings, the basic operation of the clamping portion of the clamping mechanism 12 will be described. More specifically, the interaction between the pressure-applying element 32, the shaft driving element 34 and the ball bearings 36 will be described.

FIG. 13 illustrates a portion of the active clamping mechanism 12 when the CVT is not in use. More specifically, FIG. 13 shows the ball bearings 36 in a resting state, i.e. that they are positioned resting in the "bottom" of the V-shaped double ramps 33 and 35. Accordingly, the distance "B" is as small as possible.

FIG. 14 shows a portion of the active clamping mechanism 12 when a torque is applied to the toothed gear 44 by a prime mover (not shown), i.e. when the CVT 10 is in use. When this is the case, a portion of the torque is transferred to the pressure-applying element 32 via its connection to the gear 44 by the torque-transmitting carriages 50. This torque is represented by arrow 100 in FIG. 14. The torque detected by and applied to the pressure-applying element 32 forces the element 32 to rotate. This rotation angularly moves the pressure-applying element 32 with respect to the shaft-driving element 34 since the shaft-driving element 34 is fixedly mounted to the shaft 14 (not shown) so as to prevent both axial and rotational displacement of the element 34 with respect to the shaft 14. Accordingly, the ball bearings 36 do not stay in the bottom of the V-shaped double ramps 33 and 35 but are moved along one side of the ramps 33 and 35 until the outer surface of the pressure-applying element 32 is in direct or indirect contact with the disk 16. Accordingly, the pressure-applying element 32 applies clamping pressure to the disk 16.

Therefore, by modifying the ratio of torque that enters the CVT 10 via the pressure-applying element 32 to the torque that enters the CVT 10 via the shaft-driving element 34, it is possible to actively modify the clamping force of the clamping mechanism 12.

Figure 5:
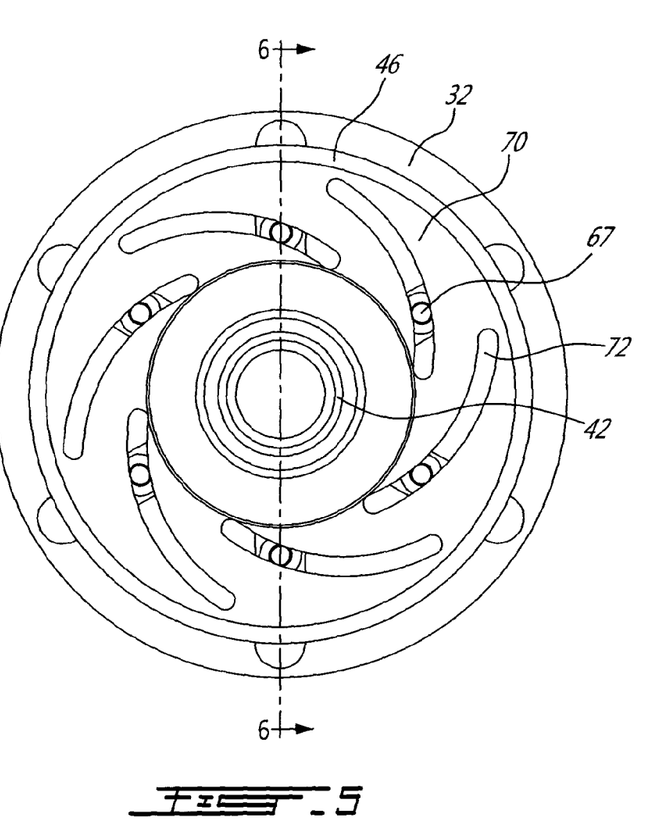
FIG. 5 is a side elevation view of the active clamping mechanism illustrating the active clamping mechanism in its minimal clamping position.
Figure 6:
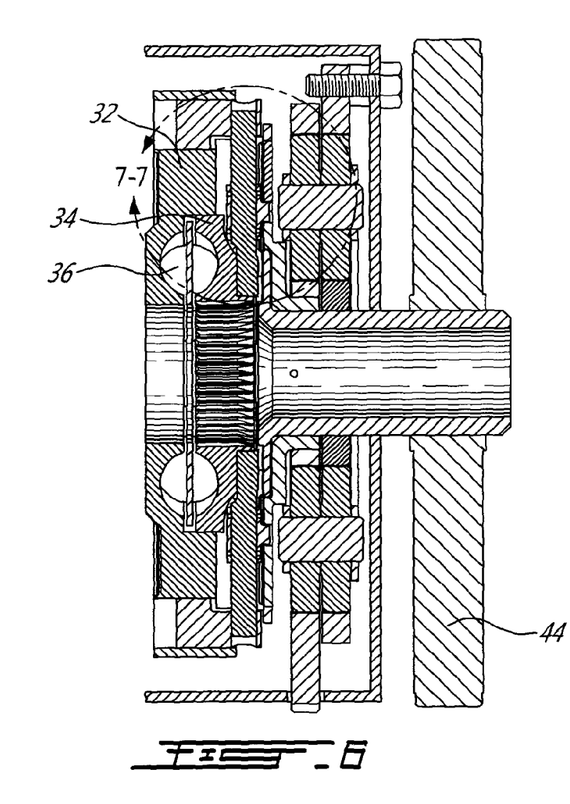
FIG. 6 is a sectional view of the clamping mechanism in its minimal clamping position taken along line 6-6 of FIG. 5.
Figure 7:
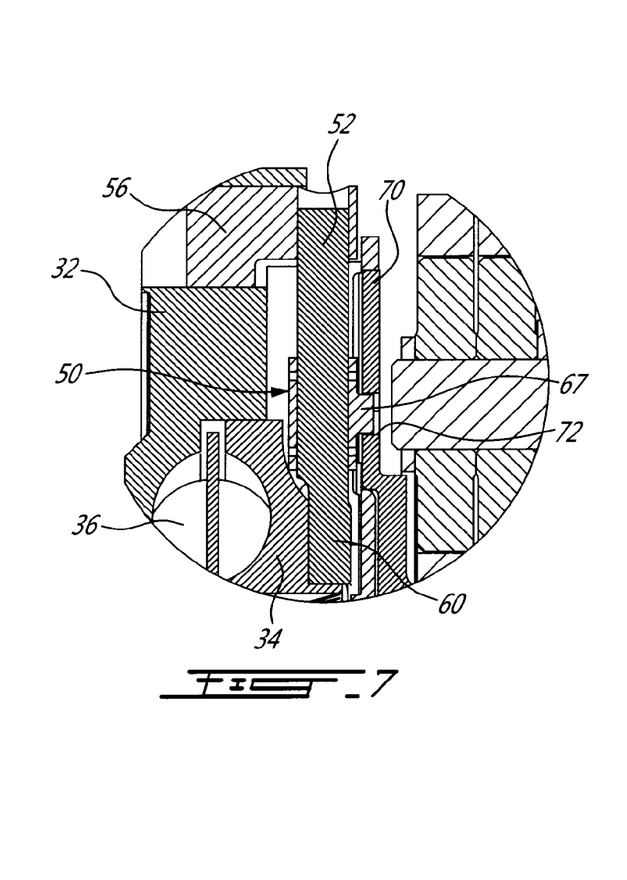
FIG. 7 is a close-up view taken along line 7-7 of FIG. 6.

Turning now to FIGS. 5, 6 and 7 of the appended drawings, which show the active clamping mechanism 12 near its minimal clamping position, the operation of the active clamping mechanism will be described.

As mentioned hereinabove, the torque from the prime mover (not shown) is transferred to the CVT 10 via the gear 44 and a transmission belt (or other power transfer mechanisms not shown). Since the gear 44 is not directly connected to the shaft 14, the torque must go through the active clamping mechanism 12 to be transferred to the CVT 10.

When the control plate 70 is so positioned that the carriages 50 are in the position illustrated in FIGS. 5, 6 and 7, the torque mainly flows from the gear 44 to the shaft driving element 34 via the carriage 50, the shaft 52 and the projections 60, since the carriages 50 are close to the end of the shaft 52 anchored to the shaft driving element 34. Of course, a portion of the torque is transferred to the pressure-applying element 32 by the carriages 50 via the interconnection of the shaft 52 to the pressure-applying element 32 through the brackets 56. Only this portion of the torque transiting through the pressure-applying element 32 will generate axial clamping force applying the pressure-applying element 32 onto the disk 16.

This position of the control plate 70 is the position where a relatively low clamping occurs since only a minor portion of the torque transits via the pressure-applying element 32, therefore causing close to a minimal axial clamping pressure.

Figure 8:
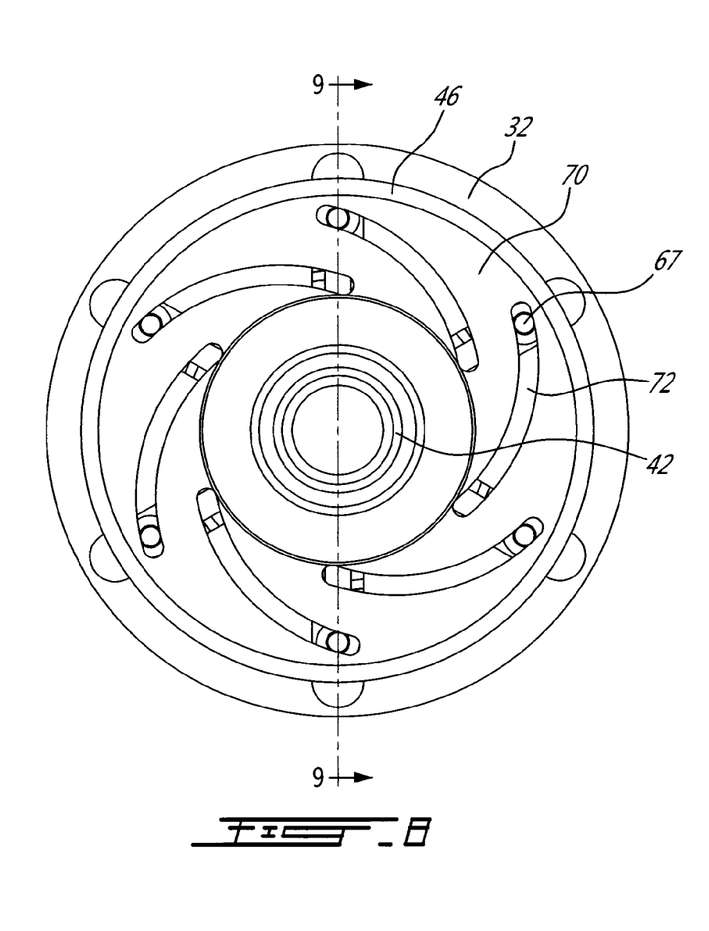
FIG. 8 is a side elevation view of the active clamping mechanism illustrating the active clamping mechanism in its maximum clamping position.
Figure 9:
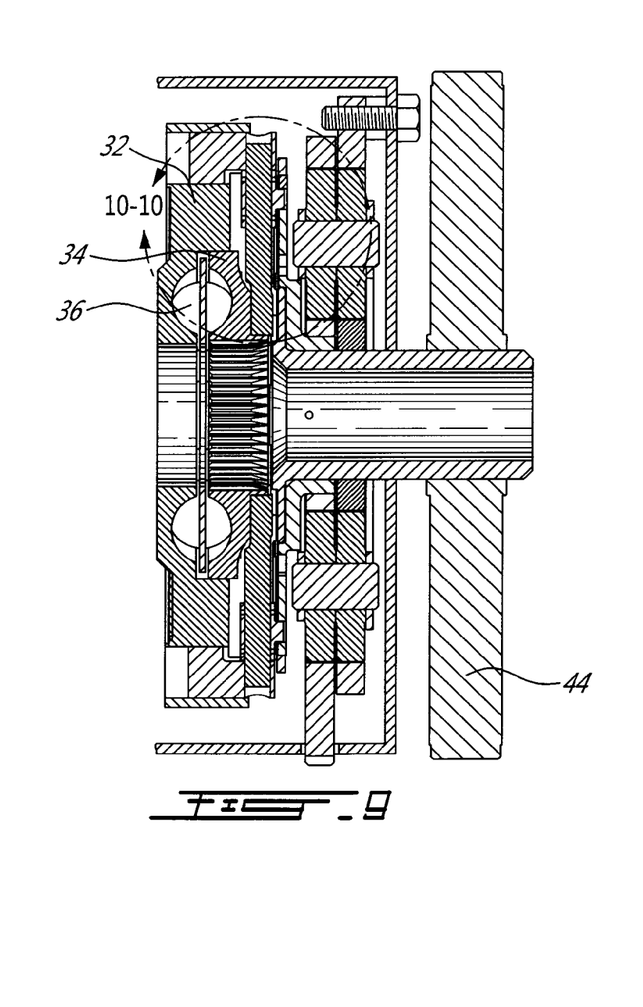
FIG. 9 is a sectional view of the clamping mechanism in its maximal clamping position, taken along line 9-9 of FIG. 8.
Figure 10:
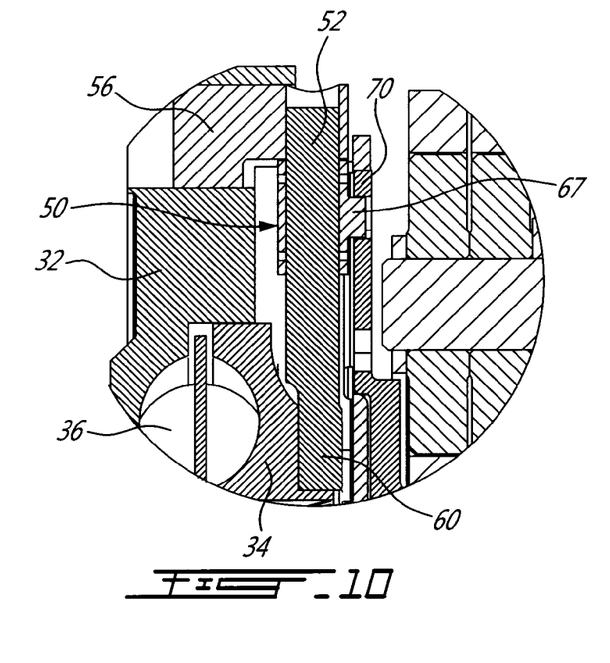
FIG. 10 is a close-up view taken along line 10-10 of FIG. 9.

Turning now to FIGS. 8, 9 and 10 of the appended drawings, the maximal clamping pressure position will be described.

When the control plate 70 has been rotated such that the carriages 50 are in the position illustrated in FIGS. 8 to 10, the torque mainly flows from the gear 44 to the shaft-driving element 34 indirectly via the carriages 50, the shafts 52, the brackets 56, the pressure-applying element 32 and the ball bearings 36. Indeed, since the carriages 50 are close to the end of the shaft 52 anchored to the pressure-applying element 32 via the brackets 56, a major portion of the torque transits through the pressure-applying element 32. Accordingly, the axial pressure applied to the disk 16 by the pressure-applying element 32 is maximized when the active clamping assembly is in this position.

Of course, a portion of the torque is transferred directly to the shaft-driving element 35 by the carriages 50 via the interconnection of the shaft 52 to the shaft-driving element 34 through the projections 60 and does not contribute to the clamping action of the pressure-applying element 32.

Accordingly, since more torque transits through the pressure-applying element 32, more clamping pressure is generated by the pressure-applying element 32.

One skilled in the art will understand that the range of movement of the control plate 70, and therefore of the carriages 50, can be designed according to the particular range of clamping pressure required by the CVT.

While the maximal and minimal clamping pressure positions of the control plate 70 have been discussed hereinabove and illustrated in the appended drawings, a multitude of intermediate positions of the carriages 50 are possible to yield various axial clamping pressures. These positions are achieved by rotating the control plate 70 to therefore radially move the carriages 50.

As will easily be understood by one skilled in the art, while the active clamping mechanism has been described herein being used to control the slip factor to achieve a desired slip/spin ratio, such active clamping mechanisms can be used to generally mechanically control the clamping pressure applied to the CVT.

It is to be noted that while six radially movable carriages 50, mounted on respective radial shafts 52, are described and illustrated herein, the number of carriages 50 and their associated radial shafts 50 and radial slots 48 could be different.

One skilled in the art will understand that since a high torque can be transferred to the CVT 10 from a prime mover (not shown) and that the totality of this torque passes through the radial shafts 52, it is possible that the elements 32 and 34 are rotationally shifted which moves the shafts 52 from their radial orientation. Since the slots 48 of the plate 46 keep their radial orientation, it is interesting that the cubical torque-receiving element 62 has the possibility to pivot, which explains the oblong radial aperture 68 and the nested cylindrical element 64.

Figure 11:
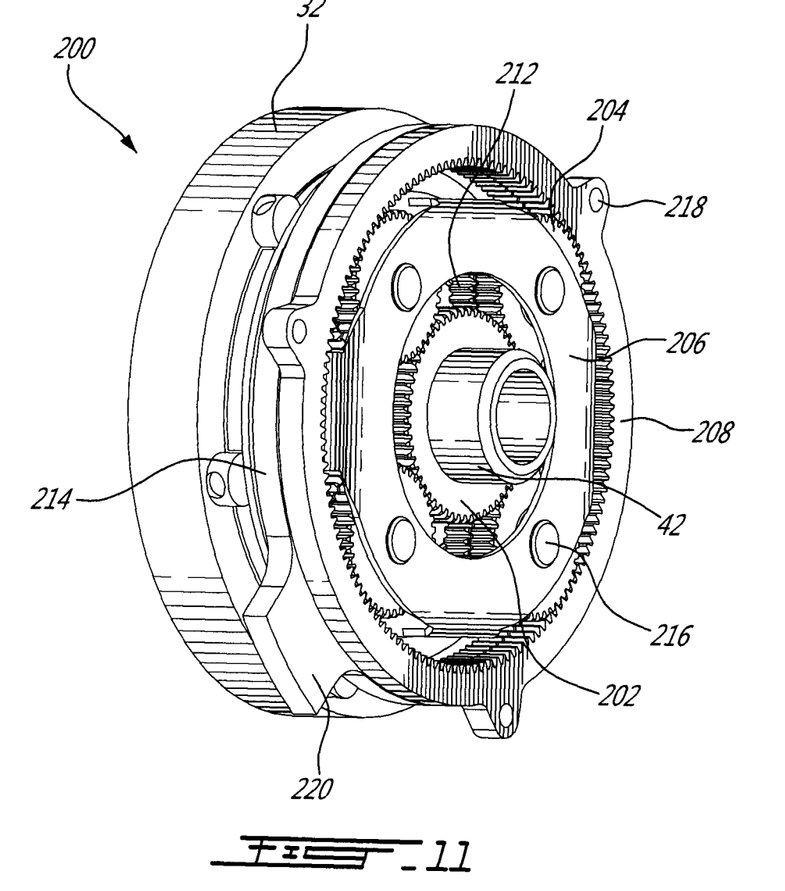
FIG. 11 is a perspective view of the actuating assembly allowing a portion of the active cam mechanism to be pivoted to thereby change the pressure applied, while the system is in operation, i.e. while it rotates.

Turning now to FIGS. 11 and 12 of the appended drawings, a mechanism 200 used to pivot the control plate 70 and therefore cause the radial displacement of the carriages 50 will now be described. It is to be noted that one skilled in the art would be in a position to design other mechanisms to so pivot the plate 70.

As can be better seen from FIG. 12, the mechanism 200 includes a first planetary system including a sun gear 202, four planet gears 204, a planet carrier 206 and a ring gear 208; and a second planetary system including a sun gear 210, four planet gears 212 and a ring gear 214. The first and second planetary systems share the planet carrier 206.

The planet gears 204 and 212 are mounted to the planet carrier 206 via four shafts 216 and are independently freewheeling thereunto.

The ring gear 208 includes apertures 218 allowing the ring gear 208 to be fixedly mounted to the casing (not shown) to prevent rotation thereof.

The ring gear 214 includes a tab 220 that is used to pivot the ring gear 214 about axis 222.

The sun gear 202 has a central aperture that is sized so that the gear 202 can be mounted to the input shaft 42 of the radially variable position driving assembly, while the sun gear 210 has a larger central aperture that is sized so that the gear 210 can be mounted to the control plate 70 via a flange 71 (see FIG. 4).

In operation, the gear 44, mounted to the input shaft 42, receives torque from a prime mover (not shown). This torque is thus transferred to the pressure-applying element 32 and to the shaft-driving element 34 according to a proportion determined by the position of the carriages 50 as described hereinabove.

Since the sun gear 202 is fixedly mounted to the shaft 42, it is also rotated by the torque supplied. Since the ring gear 208 cannot rotate since it is fixed to the casing, the rotation of the sun gear 202 causes the rotation of the planet carrier 206 via the rotation of the planet gears 204. The rotation of the planet carrier 206 causes the rotation of the planet gears 212, which in turn causes the rotation of the sun gear 210. Since all the corresponding elements of the two planetary systems have the same ratios, the sun gear 210 and the sun gear 202 rotate at exactly the same speed. Therefore the connecting plate 46 and the control plate 70, to which the sun gears 202 and 210 are respectfully mounted, rotate at exactly the same speed and the carriages 50 are not radially displaced.

However, if the tab 220 is used to pivot the second ring gear 214, this pivot action causes a momentary change in the rotation speed of the planet gears 212 and thus of the rotation speed of the sun gear 210 with respect to the sun gear 202. Accordingly, the control plate 70 is pivoted about the shaft 42 and the carriages 50 are radially displaced. The direction and amplitude of the displacement depends on the direction and amplitude of the pivotment of the ring gear 214.

It is to be understood that the over clamping protection method and clamping mechanism therefor is not limited in its application to the details of construction and parts illustrated in the accompanying drawings and described hereinabove. The over clamping protection method and clamping mechanism therefor is capable of other embodiments and of being practiced in various ways. It is also to be understood that the phraseology or terminology used herein is for the purpose of description and not limitation. Hence, although the over clamping protection method and clamping mechanism therefor has been described hereinabove by way of illustrative embodiments thereof, it can be modified, without departing from the spirit, scope and nature of the subject invention.

What is claimed is:

1. An active clamping mechanism for a Continuously Variable Transmission, the Continuously Variable Transmission comprising a longitudinal drive shaft, a drive disk, a driven disk and the active clamping mechanism, the active clamping mechanism comprising:

a pressure-applying element longitudinally movably mounted onto the drive shaft, the pressure-applying element having a first surface configured to contact one of the drive and driven disks and an opposite surface including at least three V-shaped double ramps;

a secondary element so mounted to the longitudinal drive shaft as to be axially fixed thereonto; the secondary element having a surface facing the pressure-applying element including at least three V-shaped double ramps;

at least three ball bearings interposed between the V-shaped ramps of the pressure-applying and secondary elements;

a radially variable position driving assembly including at least one radial shaft mounted to both the pressure-applying element and the secondary element, at least one radially movable carriage so mounted to the radial shaft as to radially move thereon, a connecting plate provided with at least one radial guiding slot associated with the at least one carriage, the at least one carriage being so configured as to transmit torque to both the pressure-applying and secondary elements in a proportion determined by the radial position of the radially movable carriage on the at least one radial shaft;

wherein the radial movement of the at least one carriage changes the point of contact between the connecting plate and the at least one carriage to change the proportion of the torque transferred to the pressure-applying element, one of the pressure-applying element and the secondary element being free to rotate about the drive shaft and the other of the pressure-applying element and the secondary element being so mounted to the drive shaft as to be prevented from rotating thereabout, whereby, the portion of torque applied to the pressure-applying element results in a pressure applied to the one of the drive and driven disks via a small circumferential displacement of the at least three ball bearings in the facing V-shaped double ramps of the pressure-applying and secondary elements.

2. The active clamping mechanism recited in claim 1, further comprising a preloading mechanism.

3. The active clamping mechanism as recited in claim 2, wherein the preloading mechanism is adjustable.

4. The active clamping mechanism as recited in claim 1, wherein the pressure-applying element is integral with one of the drive and driven disk of the Continuously Variable Transmission.

5. The active clamping mechanism as recited in claim 1, wherein the at least three ball bearings include six ball bearings.

6. The active clamping mechanism as recited in claim 1, wherein the first surface of the pressure-applying element is configured to contact the drive disk of the Continuously Variable Transmission.

7. The active clamping mechanism as recited in claim 1, wherein the ball bearings are mounted in a cage.

8. The active clamping mechanism as recited in claim 1, wherein the active clamping mechanism is a portion of a dual cavity full toric-drive Continuously Variable Transmission.

9. The active clamping mechanism as recited in claim 1, wherein the radially variable position driving assembly includes, a control plate so configured as to pivot about the longitudinal drive shaft, the control plate being provided with at least one curved slot configured and sized to receive a portion of the at least one carriage; the at least one curved slot being so configured that pivotment of the control plate about the drive shaft cause a radial sliding movement of the at least one carriage onto the at least one radial shaft.

10. The active clamping mechanism as recited in claim 9, wherein the connecting plate further includes an input shaft that is so configured as to receive an input gear.

11. The active clamping mechanism as recited in claim 1, wherein each at least one carriage includes a driving element slidably mounted to the radial shaft and provided with an axial projection and a cubical torque-receiving element receiving the driving element.

12. The active clamping mechanism as recited in claim 9, wherein the at least one radial shaft includes five radial shafts, the at least one carriage includes five carriages, the at least one radial guiding slot includes five radial guiding slots and the at least one curved slot includes five curved slots.

13. The active clamping mechanism as recited in claim 9, further comprising a control plate pivoting mechanism so mounted to the control plate and to a casing as to selectively pivot the control plate.

14. The active clamping mechanism as recited in claim 13, wherein the control plate pivoting mechanism includes first and second interconnected planetary gear systems.

15. The active clamping mechanism as recited in claim 14, wherein the first planetary system includes first sun gear connected to the connecting plate, first planet gears, a planet carrier and a fixed ring gear; and wherein the second planetary system includes second sun gear connected to the control plate, second planet gears mounted to the planet carrier and a pivotable ring gear.

16. A Continuously Variable Transmission including an active clamping mechanism as recited in claim 1.

* * * * *